United States Patent
Kim et al.

(10) Patent No.: US 10,485,028 B2
(45) Date of Patent: Nov. 19, 2019

(54) METHOD FOR SUPPORTING MULTI-BSS IN WIRELESS LAN SYSTEM AND DEVICE THEREFOR

(71) Applicant: LG ELECTRONICS INC., Seoul (KR)

(72) Inventors: Jeongki Kim, Seoul (KR); Kiseon Ryu, Seoul (KR); Jinyoung Chun, Seoul (KR); Jinsoo Choi, Seoul (KR); Suhwook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 15/537,355

(22) PCT Filed: Oct. 4, 2016

(86) PCT No.: PCT/KR2016/011056
§ 371 (c)(1),
(2) Date: Jun. 16, 2017

(87) PCT Pub. No.: WO2017/057990
PCT Pub. Date: Apr. 6, 2017

(65) Prior Publication Data
US 2017/0374681 A1    Dec. 28, 2017

Related U.S. Application Data

(60) Provisional application No. 62/236,153, filed on Oct. 2, 2015, provisional application No. 62/280,702, filed on Jan. 20, 2016.

(51) Int. Cl.
H04W 74/08   (2009.01)
H04W 16/02   (2009.01)
(Continued)

(52) U.S. Cl.
CPC ....... *H04W 74/0816* (2013.01); *H04L 69/323* (2013.01); *H04W 16/02* (2013.01);
(Continued)

(58) Field of Classification Search
CPC ..... H04W 74/00; H04W 74/08; H04W 84/12; H04W 52/0229; H04W 74/0816; H04W 16/02; H04L 69/323
See application file for complete search history.

(56) References Cited

U.S. PATENT DOCUMENTS 9,942,193 B1 *  4/2018  Chu ................... H04L 61/2038
2012/0314636 A1  12/2012  Liu
(Continued)

FOREIGN PATENT DOCUMENTS

EP   3162028   5/2017
EP   3226641   10/2017
(Continued)

OTHER PUBLICATIONS

PCT International Application No. PCT/KR2016/011056, Notification of Transmittal of the International Search Report and the Written Opinion of the International Searching Authority, or Declaration dated Jan. 13, 2017, 9 pages.
(Continued)

*Primary Examiner* — Gbemileke J Onamuti
(74) *Attorney, Agent, or Firm* — Lee, Hong, Degerman, Kang & Waimey PC

(57) ABSTRACT

A method by which an access point (AP) supports multi-basic service sets (BSSs) in a wireless LAN system, according to one embodiment of the present invention, comprises the steps of: setting a plurality of BSS identifiers for each individual BSS belonging to the multi-BSSs; and transmitting a frame for notifying a station (STA) of the plurality of BSS identifiers set for each individual BSS, wherein the
(Continued)

plurality of BSS identifiers include a first BSS identifier and a second BSS identifier, which has a length shorter than that of the first BSS identifier, and the first BSS identifier is set to different values for each individual BSS, but the second BSS identifier can be set to the same value for all of the multi-BSSs.

7 Claims, 22 Drawing Sheets

(51) Int. Cl.
H04W 52/02 (2009.01)
H04W 84/12 (2009.01)
H04L 29/08 (2006.01)
H04W 74/00 (2009.01)

(52) U.S. Cl.
CPC ... *H04W 52/0219* (2013.01); *H04W 52/0229* (2013.01); *H04W 74/00* (2013.01); *H04W 74/08* (2013.01); *H04W 84/12* (2013.01); *Y02D 70/14* (2018.01); *Y02D 70/142* (2018.01); *Y02D 70/22* (2018.01)

(56) References Cited

U.S. PATENT DOCUMENTS

| 2014/0286203 | A1 | 9/2014 | Jindal et al. |
| 2016/0345258 | A1* | 11/2016 | Zhou ............... H04W 52/0206 |
| 2017/0094685 | A1* | 3/2017 | Noh .................. H04W 72/042 |
| 2018/0295567 | A1 | 10/2018 | Ko et al. |

FOREIGN PATENT DOCUMENTS

| WO | 2015050311 | 4/2015 |
| WO | 2015093704 | 6/2015 |
| WO | 2015112780 | 7/2015 |
| WO | 2015120488 | 8/2015 |
| WO | 2015198157 | 12/2015 |

OTHER PUBLICATIONS

Ma, J. et al., "Further consideration on receive behavior based on the cascading structure and the BSS color scheme," IEEE 802.11-15/1081r4, Sep. 2015, 11 pages.

European Patent Office Application Serial No. 16852136.7, Search Report dated Apr. 3, 2019, 7 pages.

* cited by examiner

FIG. 5
(a) 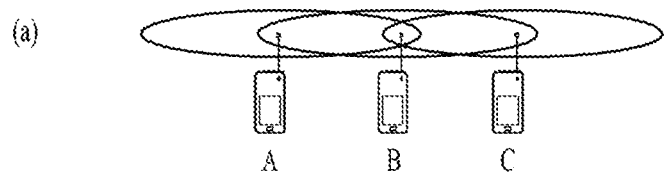
(b) 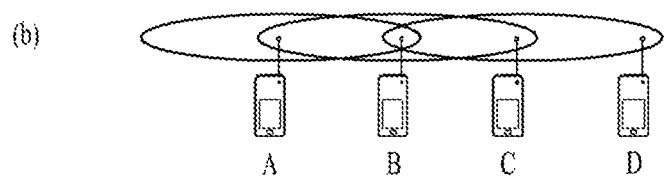
FIG. 6
(a) 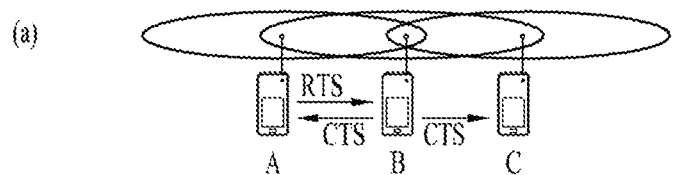
(b) 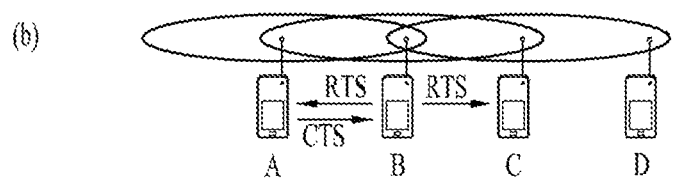

METHOD FOR SUPPORTING MULTI-BSS IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2016/011056, filed on Oct. 4, 2016, which claims the benefit of U.S. Provisional Application Nos. 62/236,153, filed on Oct. 2, 2015 and 62/280,702, filed on Jan. 20, 2016, the contents of which are all hereby incorporated by reference herein in their entirety.

TECHNICAL FIELD

The present invention relates to a wireless LAN system and, more particularly, to an operating method of an access point or a station in a multi-BSS environment in which different BSSIDs are allocated to individual BSSs and an apparatus therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention devised to solve the problem lies in an AP and a station for minimizing frame collision due to spatial reuse operations of different BSSs in an environment in which multiple BSSs are supported by the same AP and efficiently performing power saving operation of a station for an intra-BSS PPDU.

The present invention is not limited to the above technical problems and other technical objects may be inferred from embodiments of the present invention.

Technical Solution

In an aspect of the present invention, a method of supporting multiple basic service sets (BSSs) by an access point (AP) in a wireless LAN system includes: setting a plurality of BSS identifiers per individual BSS belonging to the multiple BSSs; and transmitting a frame notifying a station (STA) of the plurality of BSS identifiers set per the individual BSS, wherein the plurality of BSS identifiers includes a first BSS identifier and a second BSS identifier which has a shorter length than the first BSS identifier, and the first BSS identifier is set to a value that is different per the individual BSS whereas the second BSS identifier is set to a value that is identical value for all the multiple BSSs.

In another aspect of the present invention, an AP supporting multiple BSSs in a wireless LAN system includes: a processor for setting a plurality of BSS identifiers per individual BSS belonging to the multiple BSSs; and a transmitter for transmitting a frame notifying an STA of the plurality of BSS identifiers set per the individual BSS, wherein the plurality of BSS identifiers includes a first BSS identifier and a second BSS identifier which has a shorter length than the first BSS identifier, and the first BSS identifier is set to a value that is different per the individual BSS whereas the second BSS identifier is set to a value that is identical for all the multiple BSSs.

In another aspect of the present invention, a method of receiving, by an STA, a frame from an AP supporting multiple BSSs in a wireless LAN system includes: receiving, from the AP, a frame notifying that a plurality of BSS identifiers has been set per individual BSS belonging to the multiple BSSs; and decoding the frame, wherein the plurality of BSS identifiers includes a first BSS identifier and a second BSS identifier which has a shorter length than the first BSS identifier, and the first BSS identifier is set to a value that is different per the individual BSS whereas the second BSS identifier is set to a value that is identical for all the multiple BSSs.

In another aspect of the present invention, a station for receiving a frame from an AP supporting multiple BSSs in a wireless LAN system includes: a receiver for receiving, from the AP, a frame notifying that a plurality of BSS identifiers has been set per individual BSS belonging to the multiple BSSs; and a processor for decoding the frame, wherein the plurality of BSS identifiers includes a first BSS identifier and a second BSS identifier which has a shorter length than the first BSS identifier, and the first BSS identifier is set to a value that is different per the individual BSS whereas the second BSS identifier is set to a value that is identical for all the multiple BSSs.

The first BSS identifier may be a BSSID and the second BSS identifier may be a BSS color.

A physical layer protocol data unit (PPDU) exchanged between the AP and the STA is an intra-BSS PPDU or an inter-BSS PPDU may be determined on the basis of the second BSS identifier included in a signal (SIG) field of the PPDU. For example, a PPDU transmitted from a second BSS of the multiple BSSs which is not a first BSS to which the STA belongs is considered as an intra-BSS PPDU at the STA.

The frame may be a beacon frame, a probe response frame or an association response frame.

The frame may include a single second BSS identifier commonly applied to the multiple BSSs.

The STA may receives a PPDU from the AP or another STA and determine whether the PPDU is an intra-BSS PPDU or an inter-BSS PPDU on the basis of the second BSS identifier included in a SIG field of the PPDU. The STA may consider a PPDU transmitted from a second BSS of the multiple BSSs which is not a first BSS to which the STA belongs as an intra-BSS PPDU.

The STA may determine whether a medium is idle on the basis of an overlapping BSS packet detection (OBSS PD) level which is higher than a clear channel assessment (CCA) level applied to the intra-BSS PPDU when the PPDU is determined to be the inter-BSS PPDU.

The STA may enter to a doze state until an end of the PPDU when the PPDU is determined to be the intra-BSS PPDU and the PPDU does not intend reception of the STA.

Advantageous Effects

According to an embodiment of the present invention, different BSSIDs are set for multiple BSSs supported by the same AP and the same BSS color is set for all BSSs, to thereby minimize frame collision due to spatial reuse operations of different BSSs and efficiently perform power saving operation of STAs for an intra-BSS PPDU.

Other technical effects in addition to the above-described effects may be inferred from embodiments of the present invention.

DESCRIPTION OF DRAWINGS

FIG. 5 is an explanatory diagram of a hidden node and an exposed node.

FIG. 6 is an explanatory diagram of RTS and CTS.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
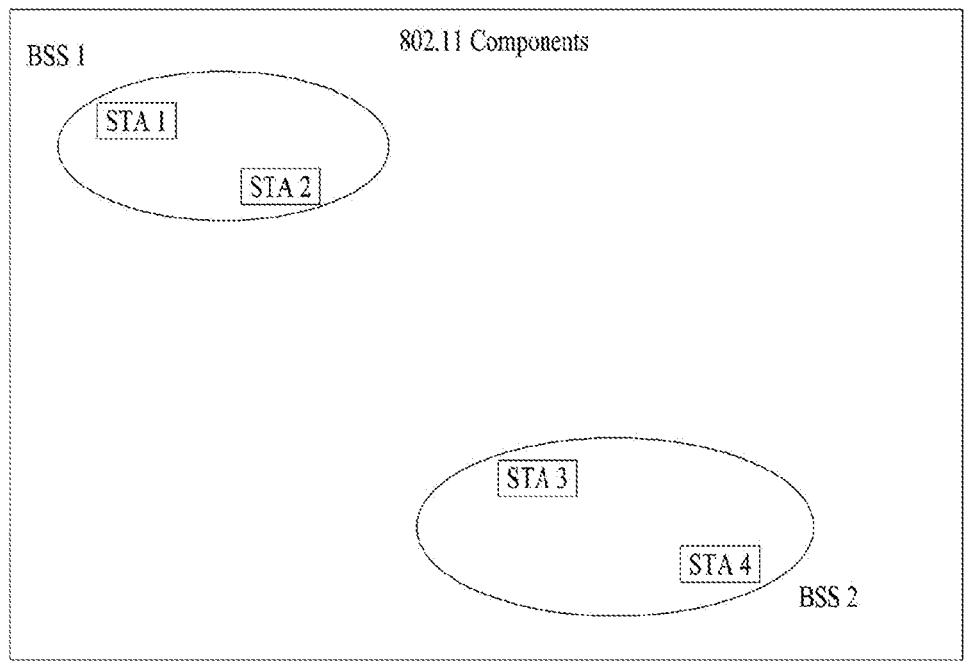
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS S).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
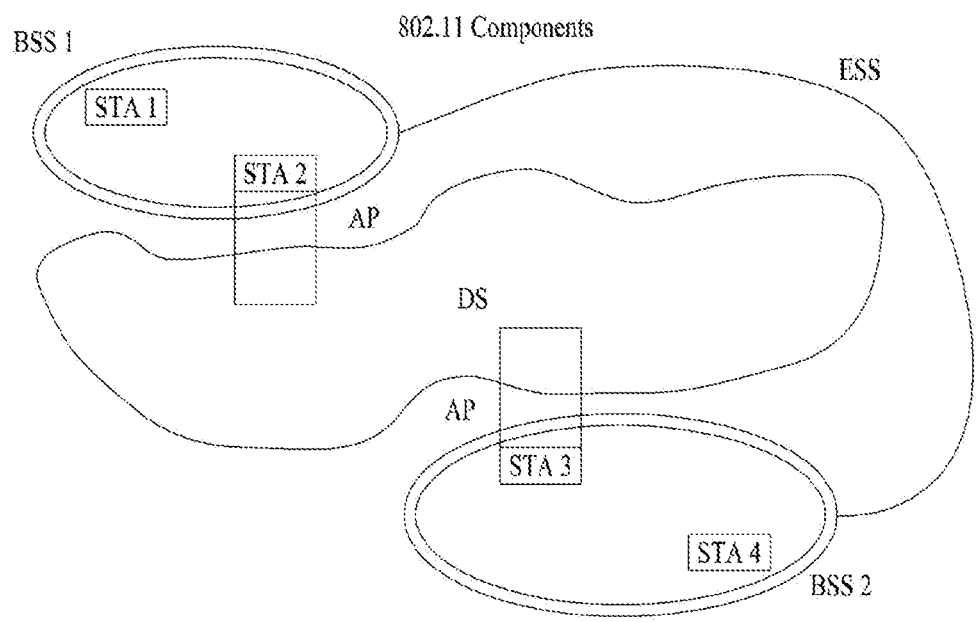
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLMEZ_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
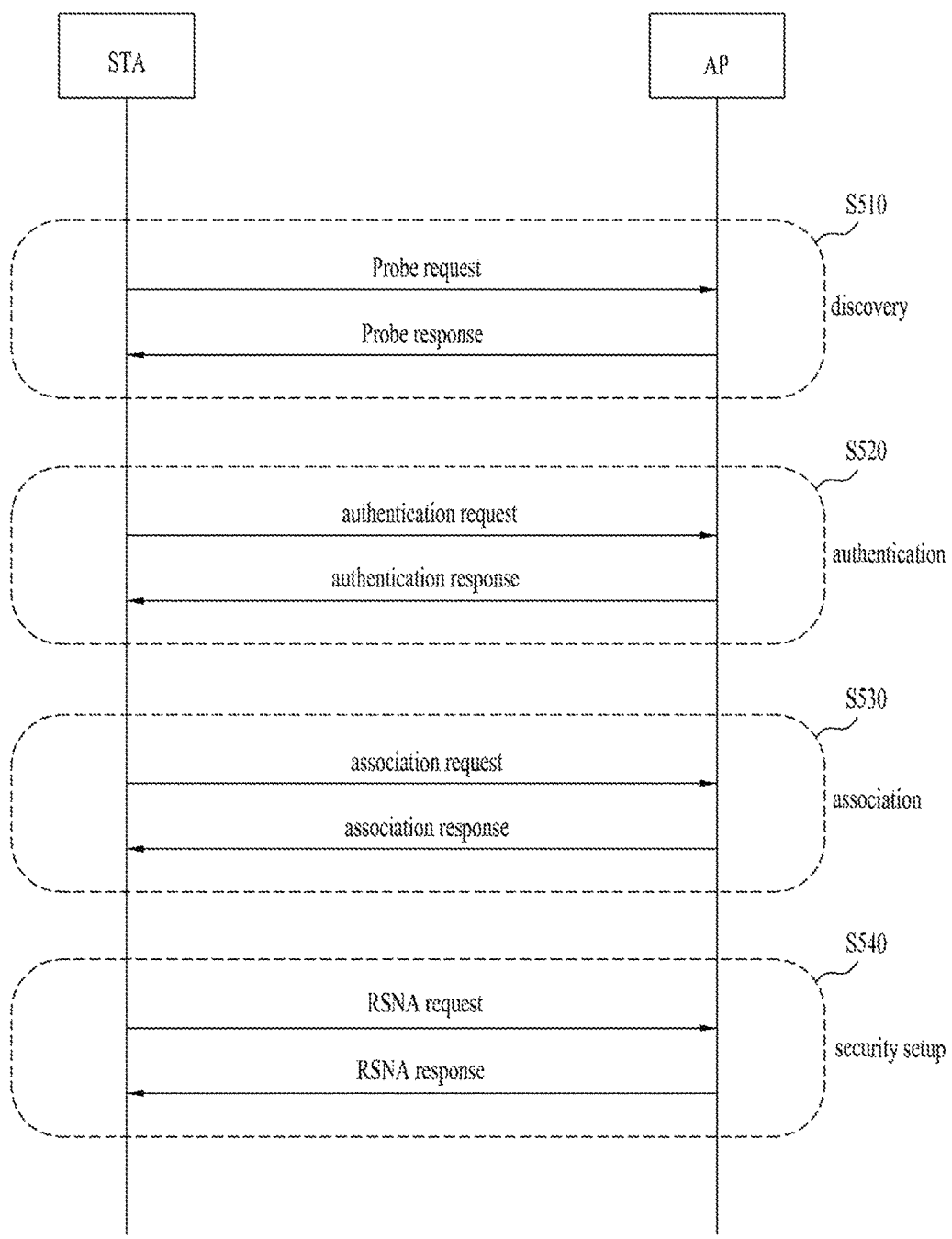
FIG. 3 illustrates a general link setup procedure.

FIG. 3 is a flowchart explaining a general link setup process according to an exemplary embodiment of the present invention.

In order to allow a STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11-based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
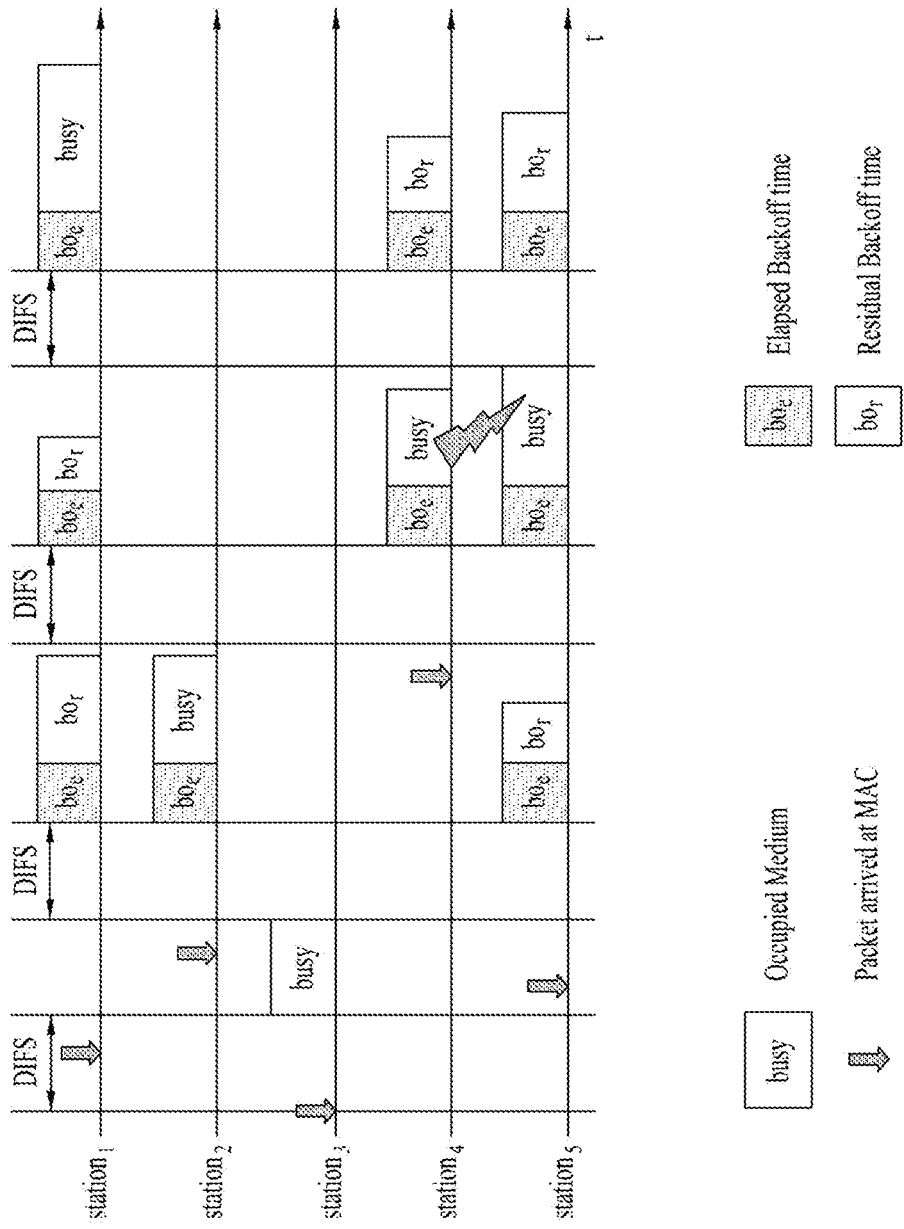
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
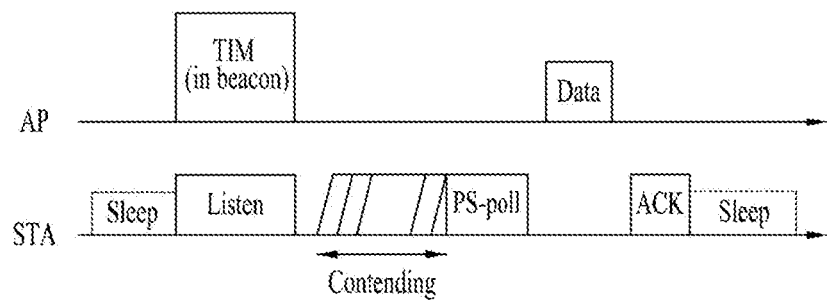
FIGS. 7 to 9 are explanatory diagrams of operation of an STA that has received TIM.
Figure 8:
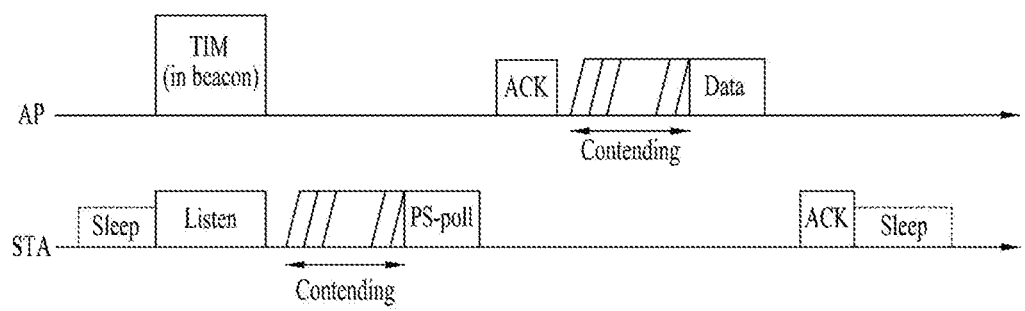
Figure 9:
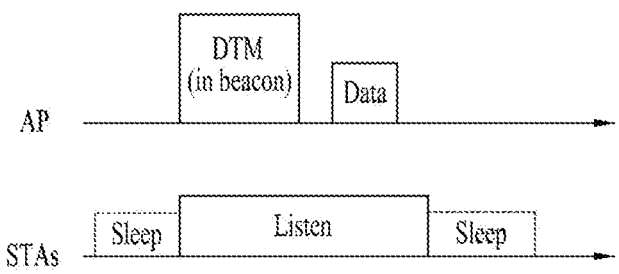

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
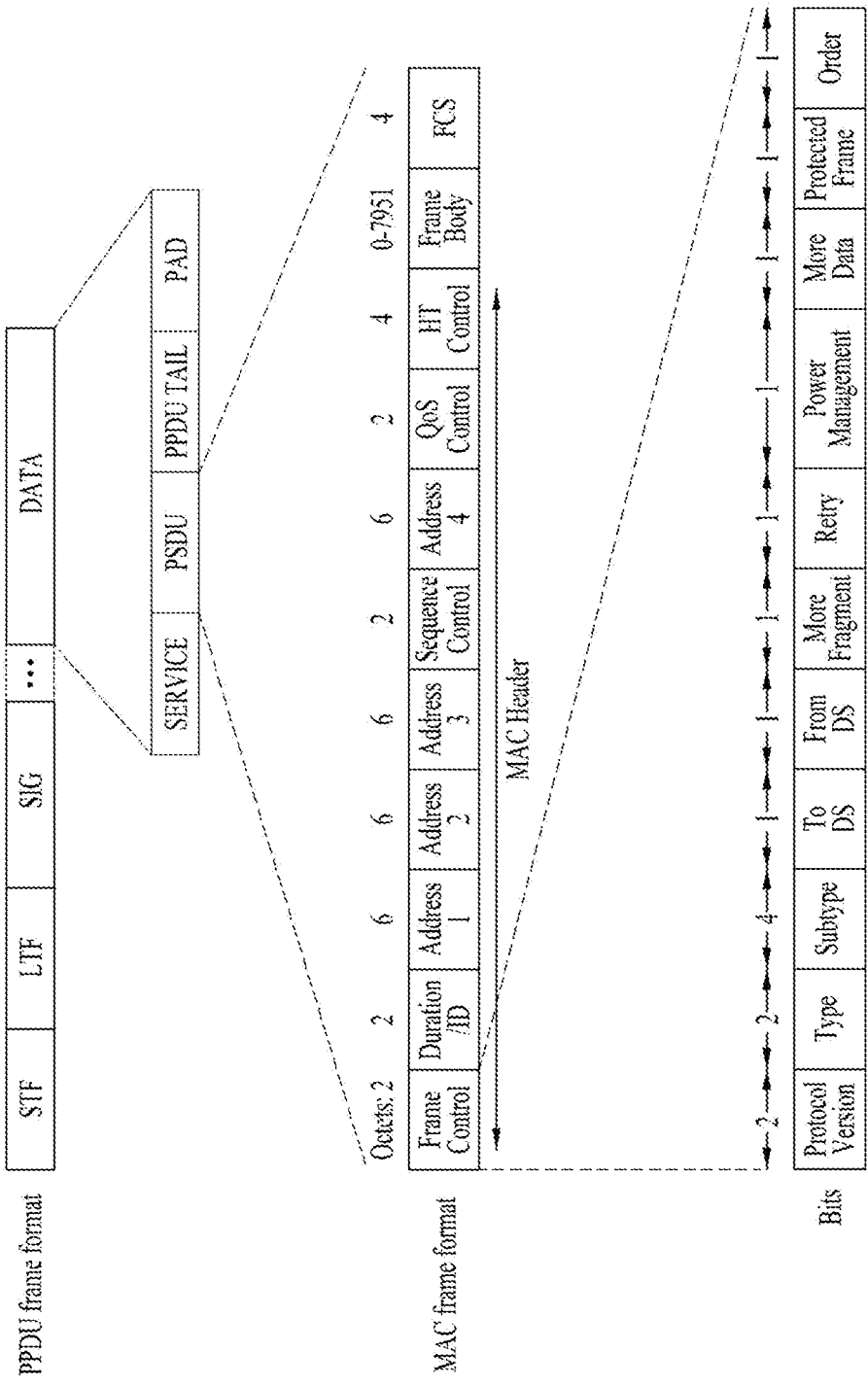
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), am LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant frame.

The duration/ID field included in the MAC header may be set to a 16-bit length (e.g., B0 to B15). Content included in the duration/ID field may depend on frame type and subtype, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
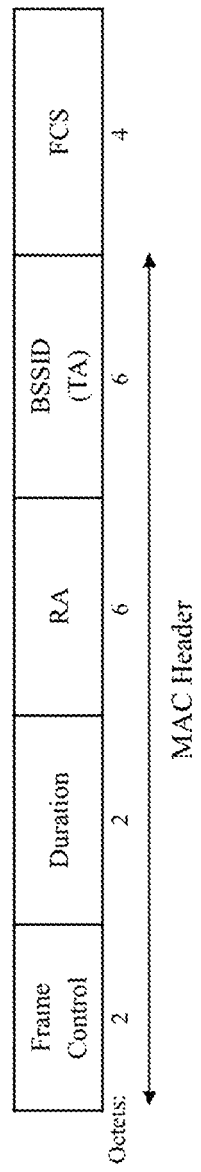
FIG. 11 illustrates a contention free (CF)-END frame.
Figure 12:
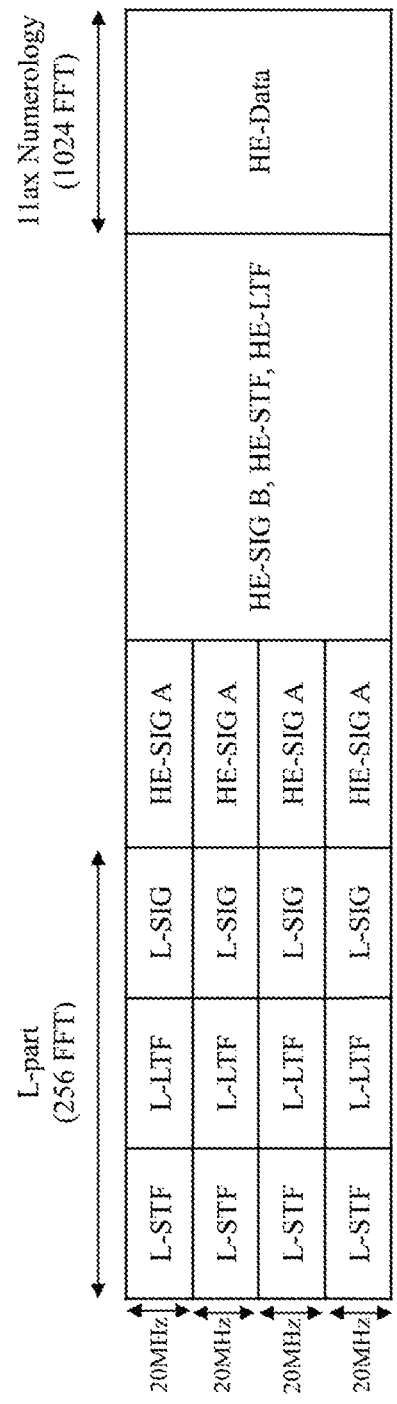
FIG. 12 illustrates an example of an HE PPDU.

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Example of HE PPDU Structure

A description will be given of examples of an HE PPDU (High Efficiency Physical layer Protocol Data Unit) format in a wireless LAN system supporting 11ax.

FIGS. 12 to 16 illustrate example of the HE PPDU.

An HE-SIG A (or HE-SIG1) field follows an L-Part (e.g., L-STF, L-LTF, L-SIG) and is duplicated every 20 MHz like the L-Part. For the HE-SIG A field, a DFT period of 3.2 μs and a subcarrier spacing of 312.5 KHz may be used. If MCS 0 is used, for example, the HE-SIG A field can be composed of 2 symbols.

HE-SIG A can be included in all HE PPDUs, whereas HE-SIG B can be omitted in an SU PPDU and a UL trigger based PPDU (e.g., a UL PPDU transmitted n the basis of a trigger frame).

The HE-SIG A field includes common control information (e.g., BW, GI length, BSS index, CRC, Tail, etc.) for STAs. The HE-SIG A field includes information for decoding the HE PPDU and thus information included in the HE-SIG A field may depend on the format of the HE PPDU (e.g., SU PPDU, MU PPDU, trigger-based PPDU or the like). For example, in the HE SU PPDU format, the HE-SIG A field may include at least one of a DL/UL indicator, HE PPDU format indicator, BSS color, TXOP duration, BW (bandwidth), MCS, CP+LTF length, coding information, the number of streams, STBC (e.g., whether STBC is used), transmission beamforming (TxBF) information, CRC and Tail. In the case of the HE SU PPDU format, the HE-SIG B field may be omitted. In the HE MU PPDU format, the HE-SIG A field may include at least one of a DL/UL indicator, BSS color, TXOP duration, BW, MCS information of a SIG B field, the number of symbols of the SIG B field, the number of HE LTF symbols, indicator indicating whether full band MU-MIMO is used, CP+LTF length, transmission beamforming (TxBF) information, CRC and Tail. In the HE trigger-based PPDU format, an HE-SIG A field may include at least one of a format indicator (e.g., indicating the SU PPDU or trigger-based PPDU), BSS color, TXOP duration, BW, CRC and Tail.

The HE-SIG A may include user allocation information, for example, at least one of an STA ID such as a PAID or a GID, allocated resource information and the number of streams (Nsts), in addition to the common control information.

BSS color information included in the HE-SIG A field is information for identifying a BSS and has a length shorter than a BSSID. For example, the BSSID can have a length of 48 bits whereas the BSS color information can have a length of 6 bits. An STA can determine whether a frame is an intra-BSS frame using the BSS color information. That is, the STA can discriminate an intra-BSS PPDU from an inter-BSS PPDU by decoding only the HE-SIG A field without the need to decode the entire HE PPDU.

Figure 13:
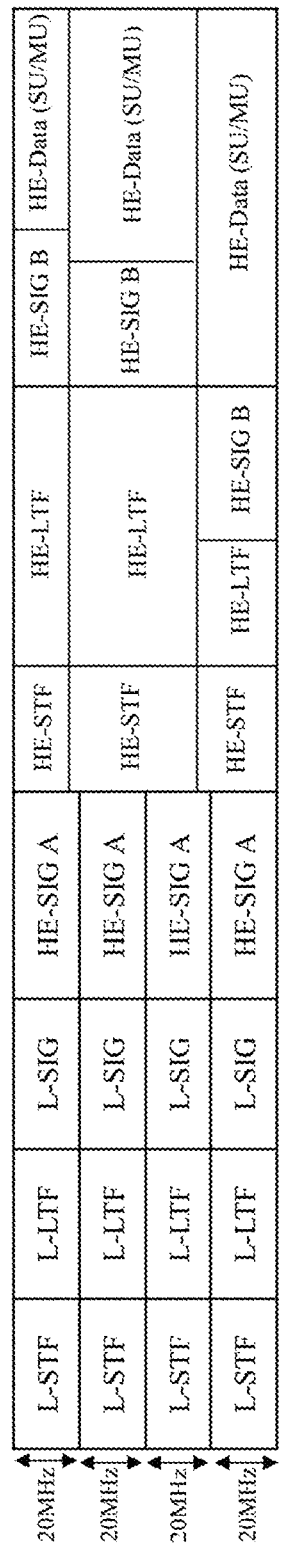
FIG. 13 illustrates another example of the HE PPDU.

Referring to FIG. 13, the HE-SIG B (or HE-SIG2) may be transmitted for each OFDMA allocation. In the case of MU-MIMO, the HE-SIG B is identified by an STA through SDM. The HE-SIG B may include additional user allocation information, for example, an MCS, coding information, STBC (Space Time Block Code) information and transmission beamforming (TXBF) information.

Figure 14:
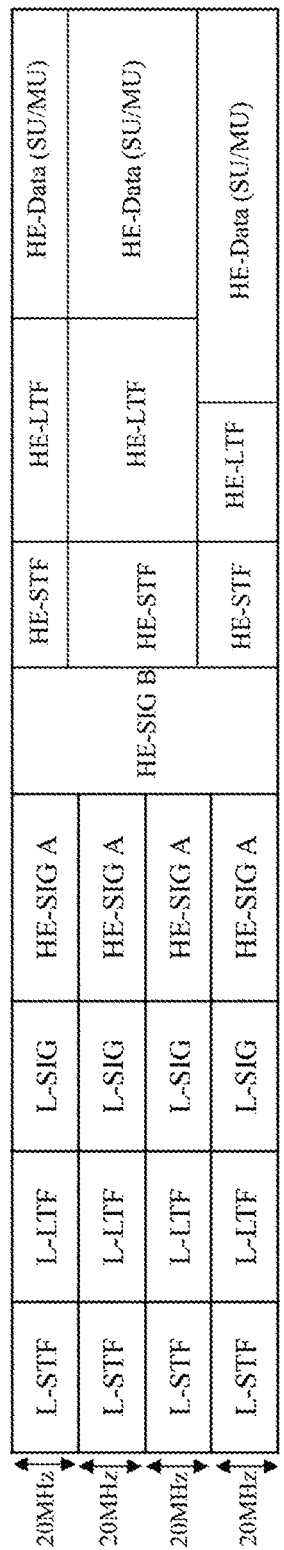
FIG. 14 illustrates another example of the HE PPDU.

FIG. 14 illustrates another example of the HE PPDU. The HE-SIG B is transmitted following the HE-SIG A. The HE-SIG B may be transmitted through the full band on the basis of numerology of the HE-SIG A. The HE-SIG B may include user allocation information, for example, STA AID, resource allocation information (e.g., allocation size), MCS, the number of streams (Nsts), coding, STBC and transmission beamforming (TXBF) information.

Figure 15:
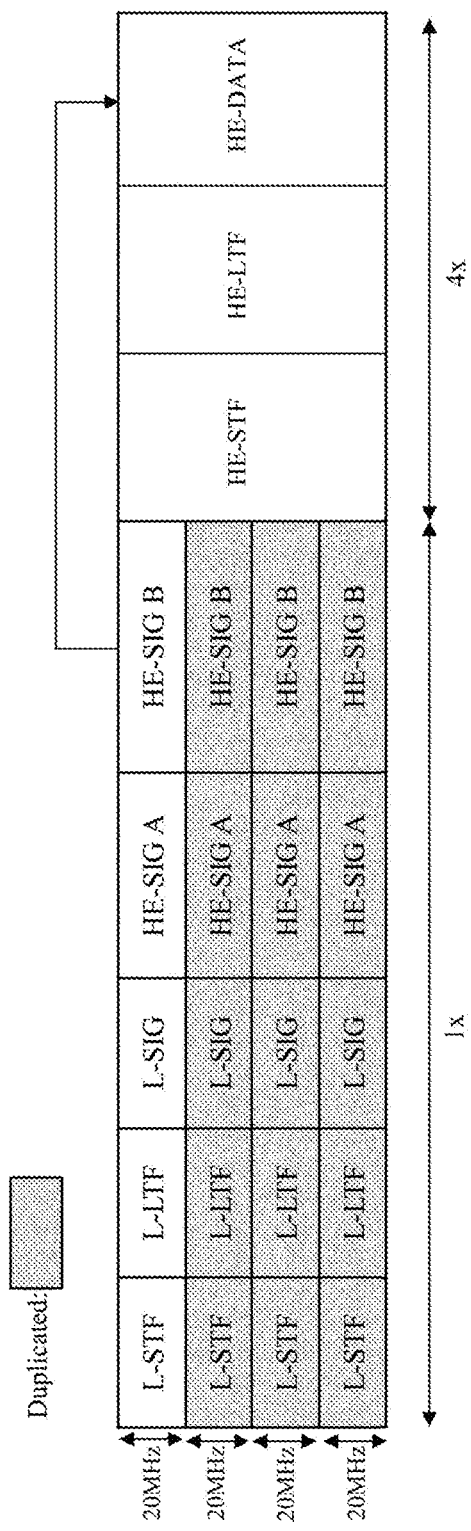
FIG. 15 illustrates another example of the HE PPDU.

FIG. 15 illustrates another example of the HE PPDU. The HE-SIG B may be duplicated per predetermined unit channel. Referring to FIG. 15, the HE-SIG B may be duplicated per 20 MHz. For example, the HE-SIG B can be transmitted in such a manner that the same information is duplicated per 20 MHz in 80 MHz bandwidth.

An STA/AP which has received the HE-SIG B duplicated every 20 MHz may accumulate the received HE-SIG B per 20 MHz channel to improve reliability of HE-SIG B reception.

Since the same signal (e.g., HE-SIG B) is duplicated and transmitted per channel, the gain of accumulated signals is proportional to the number of channels over which the signal is duplicated and transmitted to improve reception performance. In theory, a duplicated and transmitted signal can have a gain corresponding to 3 dB×(the number of channels)

compared to the signal before duplication. Accordingly, the duplicated and transmitted HE-SIG B may be transmitted with an increased MCS level depending on the number of channels through which the HE-SIG B is duplicated and transmitted. For example, if MCS0 is used for the HE-SIG B transmitted without being duplicated, MCS1 can be used for the HE-SIG B duplicated and transmitted. Since the HE-SIG B can be transmitted with a higher MCS level as the number of channels for duplication increases, HE-SIG B overhead per unit channel can be reduced.

Figure 16:
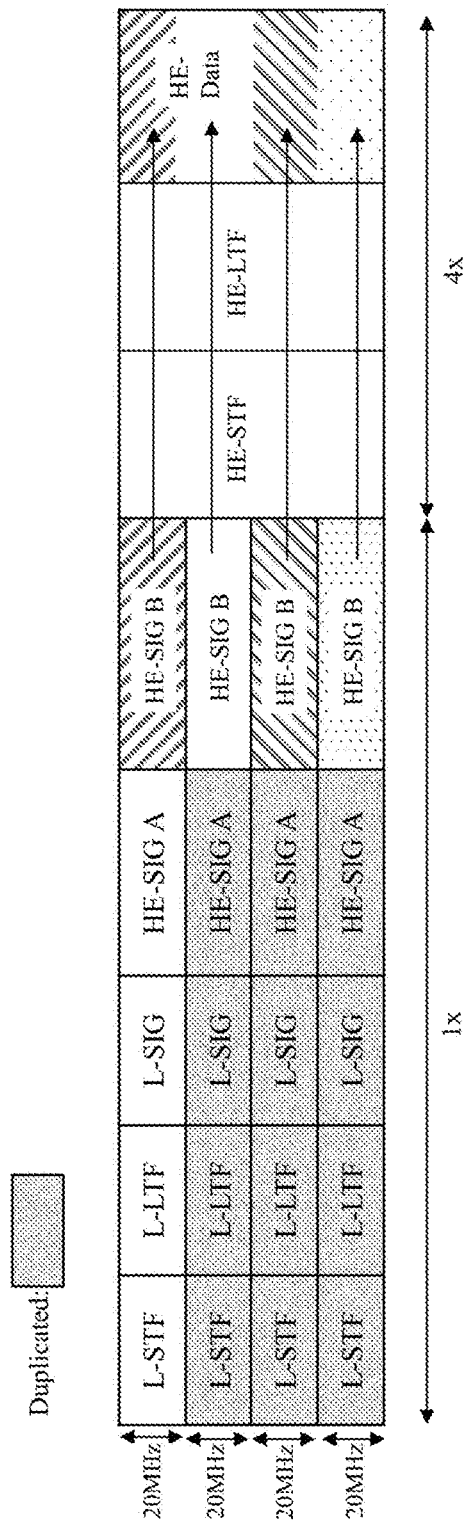
FIG. 16 illustrates another example of the HE PPDU.

FIG. 16 illustrates another example of the HE PPDU. Referring to FIG. 16, the HE-SIG B may include independent information per 20 MHz channel. The HE-SIG B may be transmitted in a 1× symbol structure like the Legacy part (e.g., L-STF, L-LTF, L-SIG) and HE-SIG A. Meanwhile, a length of "L-STF+L-LTF+L-SIG+HE-SIGA+HE-SIGB" needs to be identical in all channels in a wide bandwidth. The HE-SIG B transmitted per 20 MHz channel may include allocation information about the corresponding band, for example, allocation information per user using the corresponding band, user ID, etc. However, the information of the HE-SIG B may vary between bands because the respective bands support different numbers of users and use different resource block configurations. Accordingly, the length of the HE-SIG B may be different for respective channels.

Figure 17:
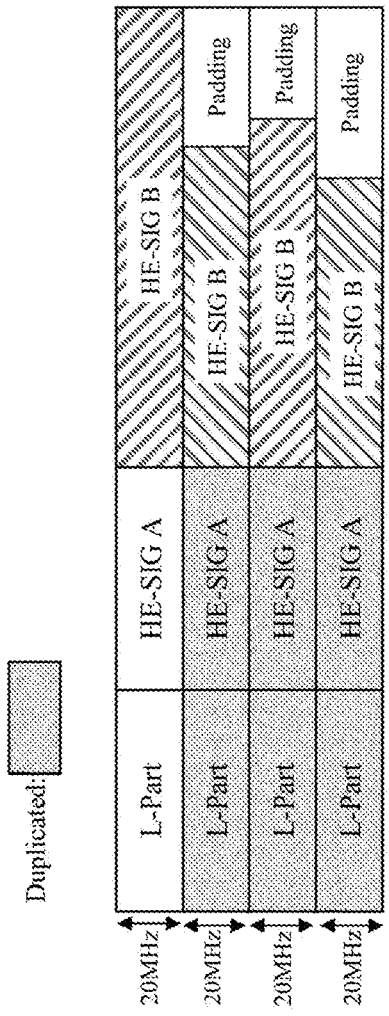
FIGS. 17 and 18 illustrating an HE-SIG B padding method.
Figure 18:

FIG. 17 illustrates an HE-SIG B padding method by which lengths before HE-STF (e.g., lengths to the HE-SIG B) become identical for respective channels. For example, the HE-SIG B may be duplicated by a padding length to align HE-SIG B lengths. As illustrated in FIG. 18, the HE-SIG B corresponding to a necessary padding length may be padded to the HE-SIG B from the start (or end) of the HE-SIG B.

According to an example, one HE-SIG B field can be transmitted when the bandwidth does not exceed 20 MHz. When the bandwidth exceeds 20 MHz, 20 MHz channels may respectively transmit one of a first type HE-SIG B (referred to hereinafter as HE-SIG B [1]) and a second type HE-SIG B (referred to hereinafter as HE-SIG B [2]). For example, HE-SIG B [1] and HE-SIG B [2] may be alternately transmitted. An odd-numbered 20 MHz channel may deliver HE-SIG B [1] and an even-numbered 20 MHz channel may deliver HE-SIG B [2]. More specifically, in the case of a 40 MHz bandwidth, HE-SIG B [1] is transmitted over the first 20 MHz channel and HE-SIG B [2] is transmitted over the second 20 MHz channel. In the case of an 80 MHz bandwidth, HE-SIG B [1] is transmitted over the first 20 MHz channel, HE-SIG B [2] is transmitted over the second 20 MHz channel, the same HE-SIG B [1] is duplicated and transmitted over the third 20 MHz channel and the same HE-SIG B [2] is duplicated and transmitted over the fourth 20 MHz channel. The HE-SIG B is transmitted in a similar manner in the case of a 160 MHz bandwidth.

As described above, the HE-SIG B can be duplicated and transmitted as the bandwidth increases. Here, a duplicated HE-SIG B may be frequency-hopped by 20 MHz from a 20 MHz channel over which an HE-SIG B of the same type is transmitted and transmitted.

HE-SIG B [1] and HE-SIG B [2] may have different content. However, HE-SIG-Bs [1] have the same content. Similarly, HE-SIG Bs [2] have the same content.

According to an embodiment, HE-SIG B [1] may be configured to include resource allocation information about only odd-numbered 20 MHz channels and HE-SIG B [2] may be configured to include resource allocation information about only even-numbered 20 MHz channels. According to another embodiment of the present invention, HE-SIG B [1] may include resource allocation information about at least part of even-numbered 20 MHz channels or HE-SIG B [2] may include resource allocation information about at least part of odd-numbered 20 MHz channels.

The HE-SIG B may include a common field and a user-specific field. The common field may precede the user-specific field. The common field and the user-specific field may be distinguished in a unit of bit(s) instead of a unit of OFDM symbol(s).

The common field of the HE-SIG B includes information about all STAs designated to receive PPDUs in a corresponding bandwidth. The common field may include resource unit (RU) allocation information. All the HE-SIG Bs [1] may have the same content and all the HE-SIG Bs [2] may have the same content. For example, when four 20 MHz channels constituting 80 MHz are classified as [LL, LR, RL, RR], the common field of HE-SIG B [1] may include a common block for LL and RL and the common field of HE-SIG B [2] may include a common block for LR and RR.

The user-specific field of the HE-SIG B may include a plurality of user fields. Each user field may include information specific to an individual STA designated to receive PPDUs. For example, the user field may include at least one of an STA ID, MCS per STA, the number of streams (Nsts), coding (e.g., indication of use of LDPC), DCM indicator and transmission beamforming information. However, the information of the user field is not limited thereto.

UL MU Transmission

Figure 19:
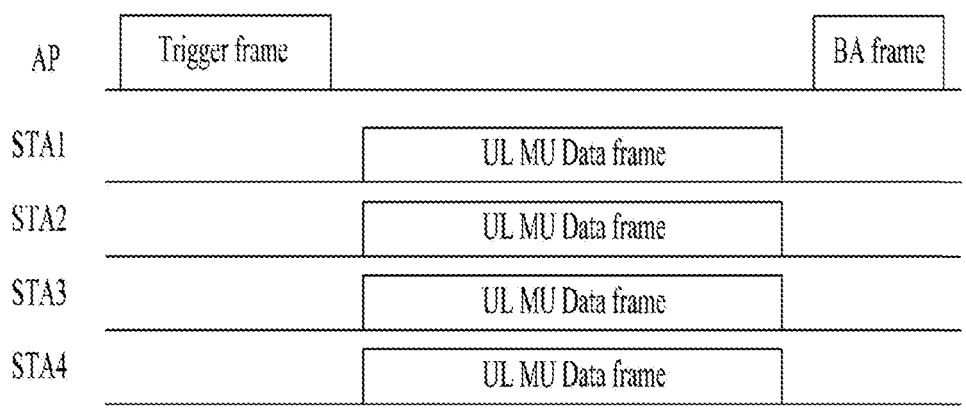
FIG. 19 is an explanatory diagram of uplink multi-user transmission according to an embodiment of the present invention.

FIG. 19 is an explanatory diagram of an uplink multi-user transmission situation according to an embodiment of the present invention.

As described above, an 802.11ax system may employ UL MU transmission. UL MU transmission may be started when an AP transmits a trigger frame to a plurality of STAs (e.g., STA1 to STA4), as illustrated in FIG. 19. The trigger frame may include UL MU allocation information. The UL MU allocation information may include at least one of resource position and size, STA IDs or reception STA addresses, MCS and MU type (MIMO, OFDMA, etc.). Specifically, the trigger frame may include at least one of (i) a UL MU frame duration, (ii) the number of allocations (N) and (iii) information per allocation. The information per allocation may include information per user (Per user Info). The information per allocation may include at least one of an AID (AIDs corresponding to the number of STAs are added in the case of MU), power adjustment information, resource (or tone) allocation information (e.g., bitmap), MCS, the number of streams (Nsts), STBC, coding and transmission beamforming information.

As illustrated in FIG. 19, the AP may acquire TXOP to transmit the trigger frame through a contention procedure to access media. Accordingly, the STAs may transmit UL data frames in a format indicated by the AP after SIFS of the trigger frame. It is assumed that the AP according to an embodiment of the present invention sends an acknowledgement response to the UL data frames through a block ACK (BA) frame.

Power Saving for Intra-BSS PPDU

When an STA supporting the HE PPDU (referred to hereinafter as HE STA) has received an intra-BSS HE PPDU and the received intra-BSS PPDU is not destined for the HE STA, the HE STA can switch to a doze state to reduce power consumption. Here, the HE STA can use BSS color information included in HE-SIG A to determine whether the HE PPDU is an intra-BSS PPDU.

Specifically, (i) when the HE STA receives an HE DL MU PPDU, BSS color information of the PPDU is not consistent with color information of a BSS with which the HE STA is associated, and HE-SIG B does not include the ID of the STA or a broadcast/multicast ID, the HE STA can enter a doze state until the end of the HE DL MU PPDU. (ii) When the HE STA receives the HE UL MU PPDU and the BSS color information of the PPDU is not consistent with the color information of the BSS with which the HE STA is associated, the HE STA can enter a doze state until the end of the HE UL MU PPDU. (iii) When the HE STA receives the HE SU PPDU, the BSS color information of the PPDU is not consistent with the color information of the BSS with which the HE STA is associated, and a UL/DL indicator indicates UL, the HE STA can enter a doze state until the end of the HE SU PPDU.

Spatial Reuse

A description will be given of improvement of OBSS (overlapping BSS) operation in an environment in which a plurality of STAs/APs is dense.

An STA can use BSS color information or MAC address information of a MAC header to determine whether a frame detected thereby is an inter-BSS frame or an intra-BSS frame. When the STA determines that the detected frame is the inter-BSS frame, the STA can use an OBSS packet detection (PD) level to determine whether a relevant medium is idle (i.e., CCA procedure). The OBSS PD level is set to be higher than a CCA (i.e., minimum receive sensitivity level) used for intra-frames.

That is, to increase a spatial use rate, the STA can determine whether the medium is busy on the basis of a higher CCA level for other BSS (OBSS) frames and update a NAV. Accordingly, when the received frame is a frame (e.g., intra-BSS frame) from a BSS to which the STA belongs, the STA determines whether the medium is busy by applying a lower CCA level. When the received frame is an OBSS frame (e.g., inter-BSS frame), the STA can determine whether the medium is idle or busy by applying a higher CCA level (e.g., OBSS level). For example, when the RSSI value of the OBSS frame is lower than the OBSS PD level, the STA can determine that a relevant channel is idle. Since lowered CCA determination standards are applied to the OBSS frame in this manner, a possibility of determining the medium to be busy upon reception of the OBSS frame decreases, that is, a possibility that the STA can use the channel increases. Accordingly, utilization of the OBSS PD level enables efficient spatial reuse.

The OBSS PD level is used not only for determination of a channel state (e.g., idle/busy) but also for update of a NAV for the OBSS frame. The NAV can be understood as a kind of a timer for restricting channel access of the STA. According to an embodiment, the STA can respectively set a NAV for the OBSS frame and a NAV for an intra-BSS frame and the OBSS PD level can be used to update the NAV for the OBSS frame.

For example, when an OBSS MAC PDU is decoded and the RSSI of the corresponding frame is lower than the OBSS PD level, the STA does not update NAVs.

BSS Color for Multiple BSSIDs

As described above, the BSS color field is an identifier indicating a BSS, and an STA can identify whether a received PPDU is an inter-BSS frame or an intra-BSS frame through the BSS color field.

Meanwhile, when a single AP has multiple BSSIDs, the AP can set a BSS color per BSS. For example, when the AP is a member belonging to a set of multiple BSSIDs or the AP operates multiple BSSs, the AP can set a BSS color per BSSID of the multiple BSSs. Operating a plurality of BSSIDs by a single AP may be understood as operating a plurality of virtual APs by a single actual AP. For example, a single actual AP may enable an STA to recognize that different APs (e.g., virtual APs) are present per BSSID.

Figure 20:
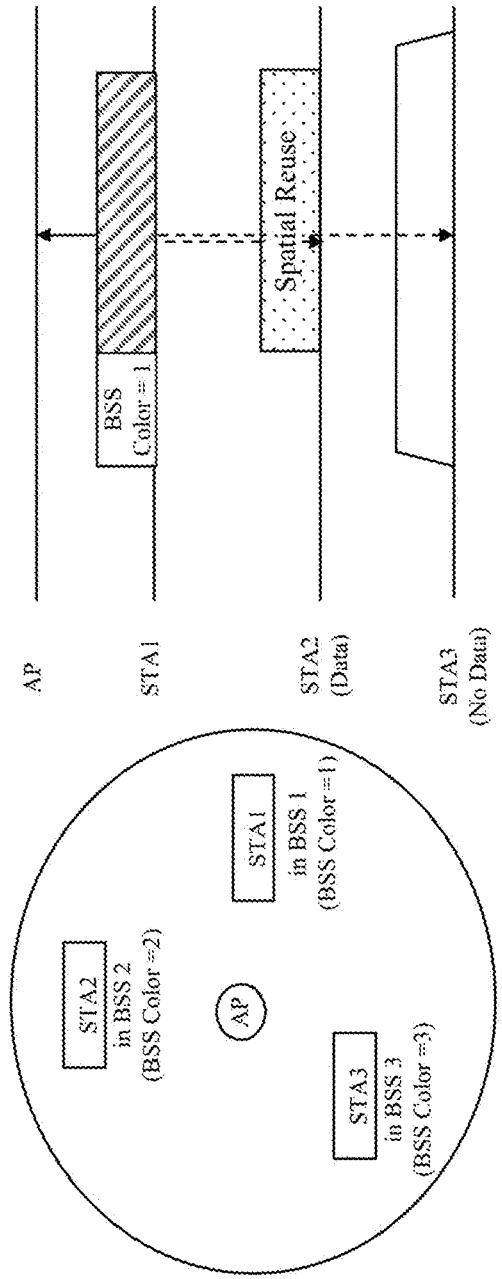
FIG. 20 illustrates an example in which an AP having multiple BSSs respectively sets different BSS colors for BSSs.

FIG. 20 illustrates an example in which an AP having multiple BSSs sets different BSS colors for the BSSs. In FIG. 20, the AP operates three BSSs BSS 1, BSS 2 and BSS 3 which respectively have BSS color values of 1, 2 and 3. STA 1 is associated with BSS 1, STA 2 is associated with BSS 2 and STA 3 is associated with BSS 3.

When an STA receives a frame transmitted from an AP associated with the STA to an STA of a different BSS, the STA can regard the frame as an inter-BSS frame and operate. This STA operation may affect frame transmission and reception of STAs of other BSSs included in the AP associated with the STA.

For example, when STA 1 transmits an HE PPDU to the AP, the BSS color of the HE PPDU is set to 1. When STA 2, which has data to transmit, receives the HE PPDU transmitted by STA 1, STA 2 regards the received HE PPDU as an inter-BSS PPDU. When the RSSI of the received HE PPDU does not exceed the OBSS PD level, STA 2 can determine that the medium is idle and attempt frame transmission (i.e., spatial reuse). Such frame transmission of STA 2 may affect reception of the HE PPDU of STA 1 by the AP.

STA 3 also regards the HE PPDU transmitted by STA 1 as an inter-BSS PPDU, and thus STA 3 cannot perform intra-PPDU power saving. Accordingly, STA 3 cannot enter a doze state although STA 3 does not have data and maintains a wake up state until the end of the HE PPDU.

A description will be given of methods for solving the aforementioned problem.

Proposal 1

According to an embodiment of the present invention, when an AP maintains multiple BSSs, different BSS colors can be set for the respective BSSs. The AP can notify STAs of BSS colors maintained thereby through a management frame such as a beacon/probe response.

Figure 21:
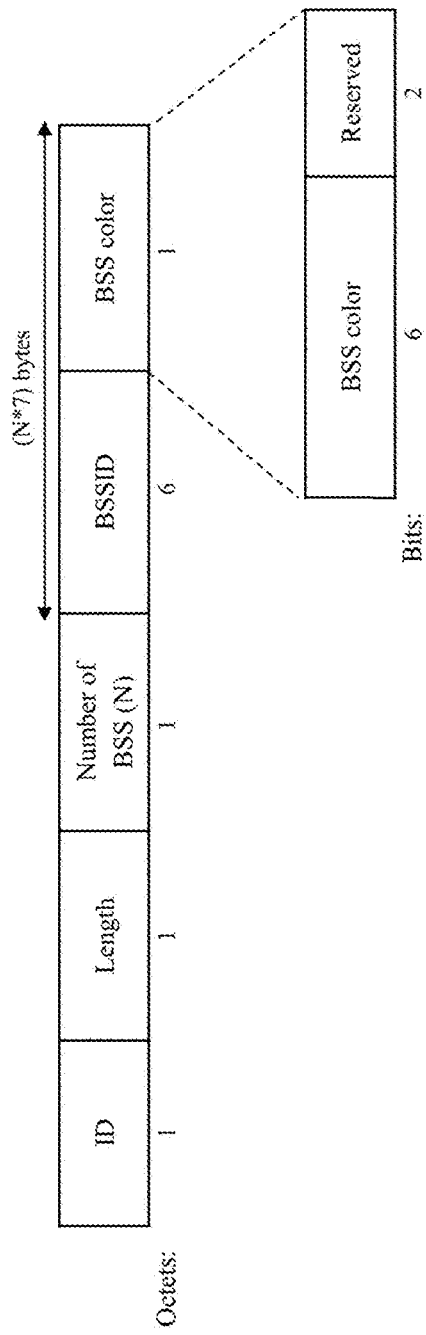
FIG. 21 illustrates multiple BSSIDs and a BSS colors set element according to an embodiment of the present invention.

FIG. 21 illustrates a multi-BSSID and BSS color set element.

The multi-BSSID and BSS color set element may be included in a management frame such as a beacon, a probe response, an association response frame or the like and deliver multi-BSS information to STAs.

The multi-BSSID and BSS color set element may include a field indicating the number (N) of BSSs. In addition, the element may include as many BSSID (6 bytes) and BSS color (1 byte) pairs as the number (N) of BSSs.

When an STA acquires one or more pieces of BSS color information maintained by an AP associated with the STA through a management frame such as a beacon or a probe response from the AP, the STA stores BSS color information corresponding to each BSSID. Then, the STA may compare information included in a BSS color set stored therein with BSS color information included in an HE-PPDU upon reception of the HE-PPDU and regard the HE-PPDU as an intra-BSS frame when the BSS color included in the HE-PPDU is consistent with the BSS color information stored in the STA. If the BSS color included in the HE-PPDU is not consistent with the BSS color information stored in the STA, the STA can regard the HE-PPDU as an inter-BSS frame.

Figure 22:
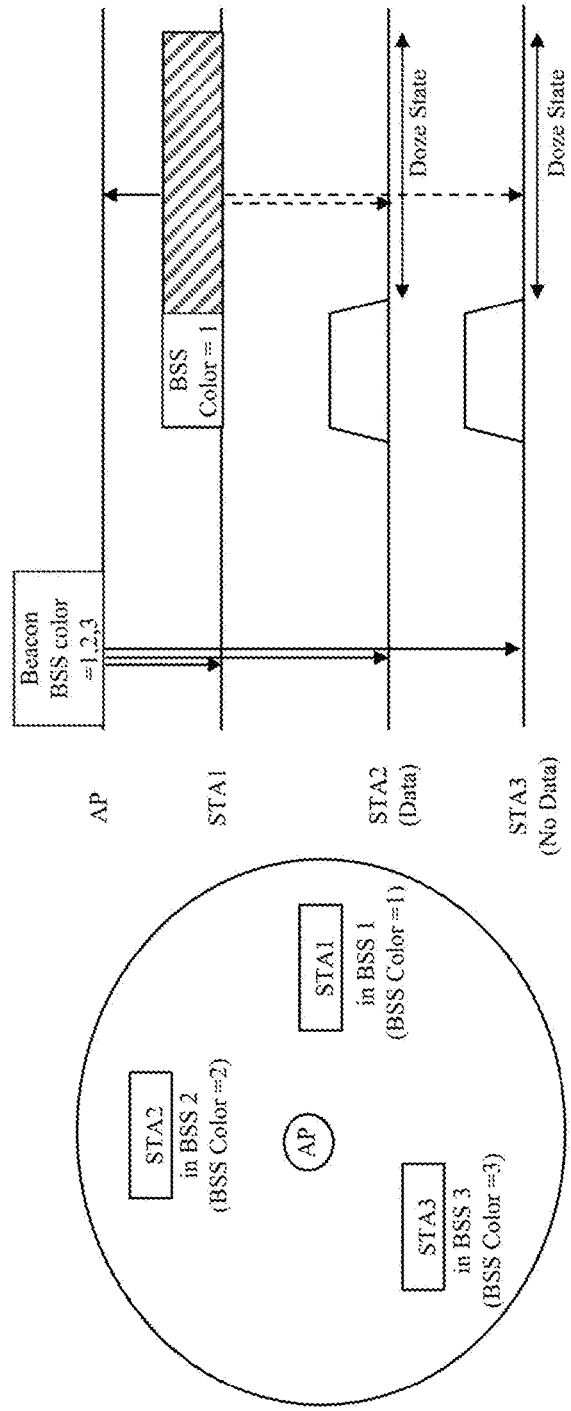
FIG. 22 illustrates an operation of an STA to store multiple BSS colors according to an embodiment of the present invention.

FIG. 22 illustrates an operation of an STA storing multiple BSS colors according to an embodiment of the present invention.

In FIG. 22, STA1 1, STA 2 and STA 3 can recognize that an AP operates multiple BSSs and BSS colors corresponding to the multiple BSSs are 1, 2 and 3, respectively by receiving a beacon including a multi-BSSID and BSS color set element from the AP. STA 2 and STA 3, which have received an HE-PPDU having a BSS color set to 1, can regard the HE-PPDU as an intra-BSS PPDU belonging to a multi-BSS set and enter a doze state during transmission of the HE-PPDU. That is, STA 2 operates in the intra-BSS PPDU power saving mode.

The AP may notify the STAs of a representative BSS color and the number of BSS colors instead of multiple BSS colors thereof by including the element shown in FIG. 21 in a beacon/probe response. On the basis of the acquired representative BSS color and the number of BSS colors, the STAs can acquire the remaining BSS colors. The remaining BSS colors may have values increasing by N from the value of the representative BSS color.

Figure 23:
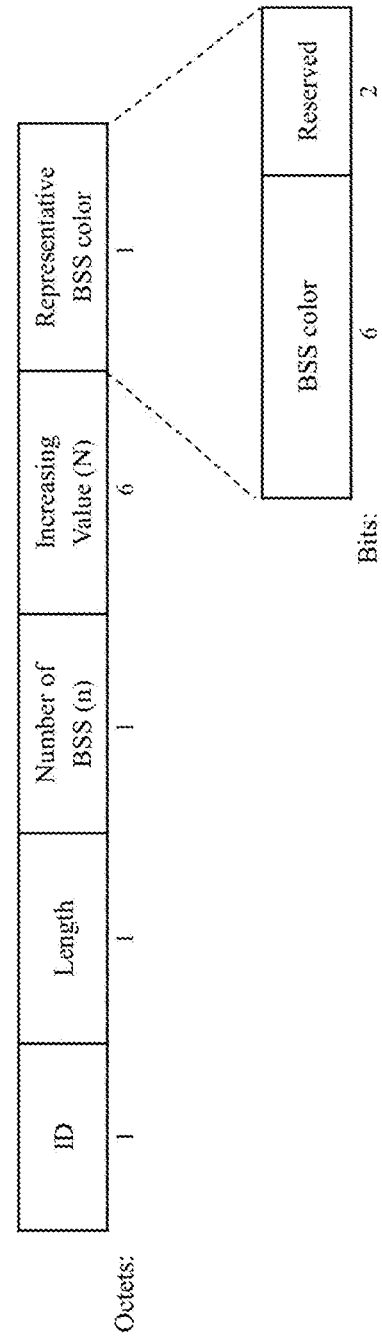
FIG. 23 illustrates an element including a representative BSS color according to an embodiment of the present invention.

FIG. 23 illustrates an element including a representative BSS color according to an embodiment of the present invention. It is assumed that the number of BSSs is n, an offset between BSS colors is N and the representative BSS color is A for convenience of description.

For example, when N=1 and n=2, a BSS color other than the representative BSS color=A is A+1. If N=1 and n=4, the second BSS color is A+1, the third BSS color is A+2 and the fourth BSS color is A+3. If N=2 and n=4, the second BSS color is A+2, the third BSS color is A+4 and the fourth BSS color is A+6.

In the above examples, the method of obtaining BSS colors other than the representative BSS color may be performed in a different manner. For example, the remaining BSS colors may be derived by decreasing the representative BSS color by N. However, the method is not limited thereto.

Proposal 2

According to an embodiment of the present invention, when an AP maintains multiple BSSs, the same BSS color can be set for the multiple BSSs.

For example, the BSS color may be arbitrarily set by the AP or some bits of a BSSID may be set to the BSS color. When some bits of the BSSID are set to the BSS color, bits that do not vary according to BSSIDs of multiple BSSs belonging to the same AP can be set to the BSS color. When some bits of the BSSID are used as the BSS color, the AP may not assign N least significant bits (LSBs) (e.g, 3 or 4 bits) to the BSS color. For example, the AP can use M most significant bits (MSBs) from among the whole bits of the BSSID for the BSS color or set M MSBs from among 24 LSBs of the BSSID to the BSS color.

Figure 24:
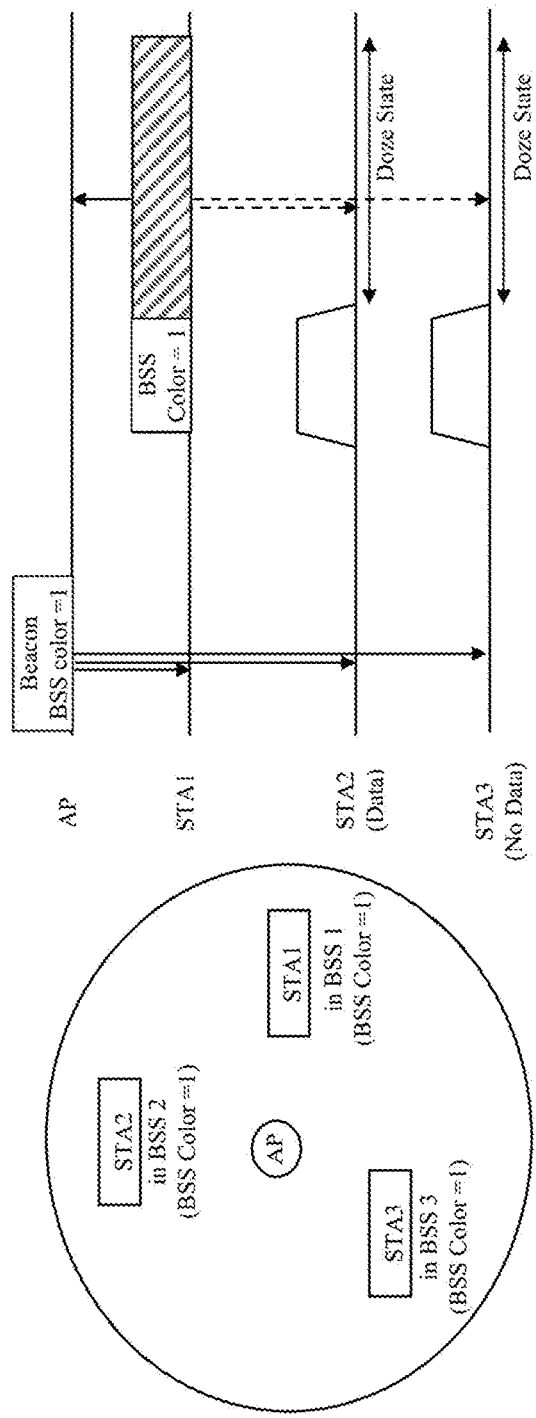
FIG. 24 illustrates an example of setting the same BSS color for multiple BSSs according to an embodiment of the present invention.

FIG. 24 illustrates an example of setting the same BSS color for multiple BSSs according to an embodiment of the present invention.

Referring to FIG. 24, an AP sets the same BSS color (=1) for multiple BSSs and transmits a beacon (or probe response).

When STA 2 belonging to BSS 2 and STA 3 belonging to BSS 1 receive an HE PPDU transmitted from STA 1 belonging to BSS 1, STA 2 and STA 3 compare the BSS color of the received HE PPDU with BSS colors of the BSSs to which they belong. Since the BSS color of the received HE PPDU is identical to the BSS colors of the BSSs to which STA 2 and STA 3 belong, STA 2 and STA 3 can regard the HE PPDU transmitted by STA 1 as an intra-BSS PPDU and operate in the intra-PPDU power saving mode and thus can enter a doze state until the end of the HE PPDU.

For example, when STA 2 and STA 3 recognize that the HE PPDU is an intra-BSS PPDU and does not intend them as receivers upon decoding HE-SIG A including the BSS color information, STA 2 and STA 3 can operate in a doze state until the end of the intra-BSS PPDU.

For example, intra-BSS PPDU end timing can be detected through the TXOP duration field included in HE-SIG A or MAC duration information included in the MAC header. An STA intended by the HE PPDU as a receiver can be detected through the format of the HE PPDU or the HE SIG-B field. If the HE PPDU is a UL PPDU, STA 2 and STA 3 can recognize that the HE PPDU intends the AP as a receiver. If the HE PPDU includes the HE-SIG B field but the HE-SIG B field does not include IDs (e.g., AIDs or PAIDs) of STA 2 and STA 3, STA 2 and STA 3 can recognize that the HE PPDU does not intend them as receivers.

Furthermore, when the intra-BSS PPDU does not intend STA 2 and STA 3 as receivers, STA 2 and STA 3 can operate in a doze state for the remaining period of the HE PPDU without completion of decoding a PSDU or an MAC frame of the intra-BSS PPDU (i.e., without completion of decoding a payload following the HE preamble).

Figure 25:
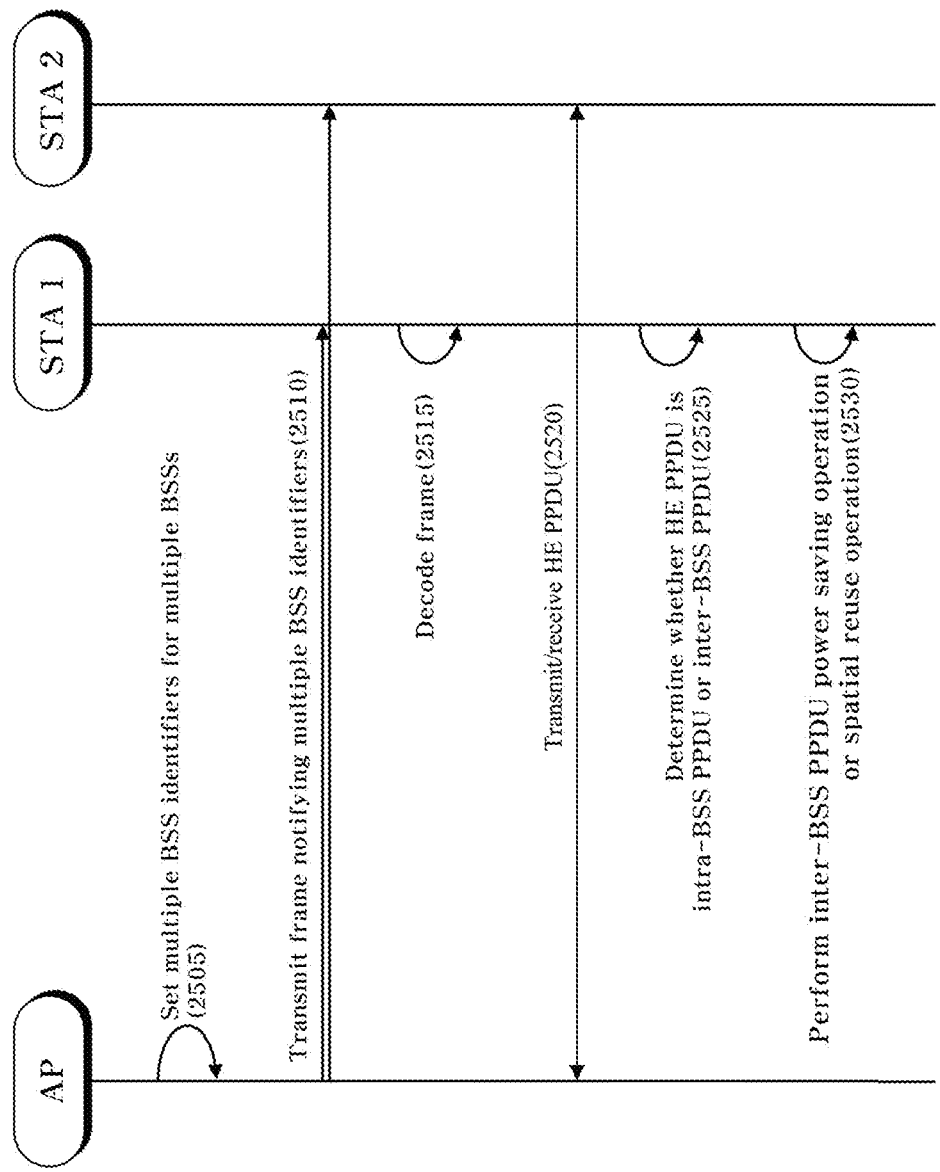
FIG. 25 illustrates a frame transmission/reception method according to an embodiment of the present invention.

FIG. 25 illustrates a frame transmission/reception method according to an embodiment of the present invention. Description of parts corresponding to the above description will be omitted.

An AP supports multiple BSSs. For example, the AP can operate multiple BSSs having different BSSIDs. This may be understood as operating a plurality of virtual APs having different BSSIDs by a single physical AP.

The AP respectively sets a plurality of BSS identifiers per individual BSS belonging to the multiple BSSs (2505). The plurality of BSS identifiers includes a first BSS identifier and a second BSS identifier shorter than the first BSSID. Here, the first BSS identifier can be set to a value that is different per the individual BSS whereas the second BSS identifier can be set to a value that is identical for all the multiple BSSs. The first BSS identifier may be a BSSID having a length of 48 bits and the second BSS identifier may be a BSS color having a length of 6 bits.

For example, the AP can respectively set BSSID 1 and BSSID 2 for BSS 1 and BSS 2 and set the same BSS color for BSS 1 and BSS 2.

The AP transmits a frame for notifying STAs of the plurality of BSS identifiers set per the individual BSS (2510). For example, the frame notifying STAs of the plurality of BSS identifiers set per the individual BSS may be a beacon frame, a probe response frame or an association response frame. Furthermore, the frame may include a single second BSS identifier field commonly applied to the multiple BSSs.

It is assumed that STA 1 belongs to BSS 1 or attempts to access BSS 1 and STA 2 belongs to BSS 2 or attempts to access BSS 2 for convenience.

STA 1 decodes the frame (2515). For example, STA 1 can recognize that the AP operates multiple BSSs by decoding the frame. STA 1 stores the BSS color along with the BSSIDs acquired through the frame.

The AP transmits/receives HE PPDUs to/from the STAs (2520). Here, whether a PPDU (Physical Layer Protocol Data Unit) is an intra-BSS PPDU or an inter-BSS PPDU can be determined on the basis of the second BSSID (e.g., BSS color) included in the HE-SIG (signal) A field of the HE PPDU.

Upon reception of a PPDU from the AP or STA 1, STA 1 can determine whether the PPDU is an intra-BSS PPDU or an inter-BSS PPDU on the basis of the second BSSID included in the SIG (signal) field of the PPDU. For example, STA 1 may consider the PPDU transmitted from BSS 2 to which STA 1 does not belong from among the multiple BSSs as an intra-BSS PPDU.

Upon determining that the PPDU is an inter-BSS PPDU, STA 1 can determine whether a medium is idle on the basis of an OBSS PD (Overlapping BSS Packet Detection) level higher than a CCA (Clear Channel Assessment) level applied to intra-BSS PPDUs.

STA 1 can enter to a doze state until an end of the PPDU when the PPDU is determined to be an intra-BSS PPDU and does not intend reception of STA 1.

Figure 26:
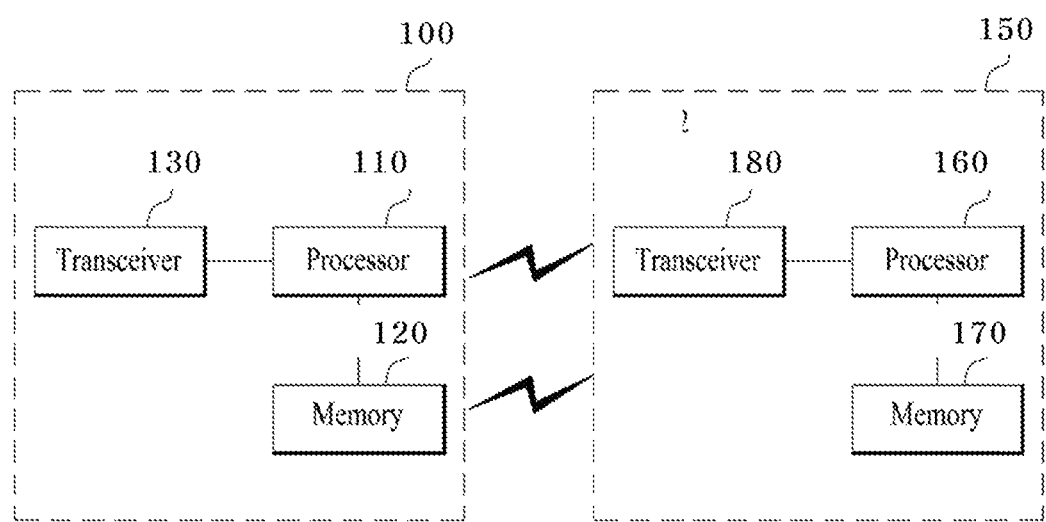
FIG. 26 illustrates an apparatus according to an embodiment of the present invention.

FIG. 26 illustrates devices for implementing the aforementioned methods.

A wireless device 100 and a wireless device 150 in FIG. 26 may correspond to the aforementioned specific STA and AP, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention can be applied to various wireless communication systems including IEEE 802.11 wireless LAN systems.

What is claimed is:

1. A method of supporting multiple basic service sets (BSSs) by an access point (AP) in a wireless local area network (LAN) system, the method comprising:
based on a plurality of BSS identifiers related to the AP, transmitting a frame notifying a station (STA) of information on the plurality of BSS identifiers related to the AP,
wherein the information on the plurality of BSS identifiers includes information on a BSS color being identical for the plurality of BSS identifier; and
transmitting a physical layer protocol data unit (PPDU) comprising the information on the BSS color to a station (STA) associated with one of the plurality BSS identifiers as intra-BSS PPDU.

2. The method of claim 1, wherein the frame is a beacon frame or a probe response frame or an association response frame.

3. The method of claim 1, wherein the BSS color has a shorter length than each of the plurality of BSS identifiers.

4. An access point (AP) relating to multiple basic service sets (BSSs) in a wireless local area network (LAN) system, the AP comprising:
a transceiver; and
a processor coupled with the transceiver and configured to:
based on a plurality of BSS identifiers related to the AP, control the transceiver to
transmit a frame notifying a station (STA) information on the plurality of BSS identifiers related to the AP,
wherein the information on the plurality of BSS identifiers includes information on a BSS color being identical for the plurality of BSS identifiers, and
control the transceiver to transmit a physical layer protocol data unit (PPDU) comprising the information on the BSS color to the STA associated with one of the plurality BSS identifiers as intra-BSS PPDU.

5. A method of receiving, by a station (STA), a signal from an access point (AP) related to supporting multiple basic service sets (BSSs) in a wireless local area network (LAN) system, the method comprising:
receiving, from the AP related to a plurality of BSS identifiers, a frame notifying information on the plurality of BSS identifiers related to the AP,
wherein the information on the plurality of BSS identifiers includes information on a BSS color being identical for the plurality of BSS identifiers;
receiving a physical layer protocol data unit (PPDU) comprising the information on the BSS color; and
entering a doze state until an end of the PPDU based on a determination that the PPDU is an intra-BSS PPDU based on the BSS color and that the PPDU does not include a STA identifier of the STA.

6. The method of claim 5, wherein the frame is a beacon frame or a probe response frame.

7. A station (STA) for receiving a signal from an access point (AP) related to supporting multiple basic service sets (BSSs) in a wireless local area network (LAN) system, the STA comprising:
a transceiver; and
a processor coupled with the transceiver and configured to:
control the transceiver to receive, from the AP related to a plurality of BSS identifiers, a frame notifying information on the plurality of BSS identifiers related to the AP,
wherein the information on the plurality of BSS identifiers includes information on a BSS color being identical for the plurality of BSS identifiers;
control the transceiver to receive a physical layer protocol data unit (PPDU) comprising the information on the BSS color; and
entering a doze state until an end of the PPDU based on a determination that the PPDU is an intra-BSS PPDU based on the BSS color and that the PPDU does not include a STA identifier of the STA.

* * * * *